C. J. VAN DALEN
H.C.A. VAN DUUREN
INVENTORS
BY Hugh A Kirk

Jan. 31, 1961 C. J. VAN DALEN ET AL 2,970,189

ARHYTHMIC TELECOMMUNICATION SYSTEM

Filed July 25, 1956

8 Sheets-Sheet 2

C. J. VAN DALEN
H.C.A. VAN DUUREN INVENTORS
BY Hugh A. Kirk

Jan. 31, 1961 C. J. VAN DALEN ET AL 2,970,189

ARHYTHMIC TELECOMMUNICATION SYSTEM

Filed July 25, 1956

8 Sheets-Sheet 3

C. J. VAN DALEN
H. C. A. VAN DUUREN INVENTORS

BY Hugh A. Kirk

Jan. 31, 1961 C. J. VAN DALEN ET AL 2,970,189

ARHYTHMIC TELECOMMUNICATION SYSTEM

Filed July 25, 1956

8 Sheets-Sheet 4

C. J. VAN DALEN
H. C. A. VAN DUUREN
INVENTORS

BY Hugh A. Kirk

C. J. VAN DALEN
H.C.A. VAN DUUREN
INVENTORS
BY Hugh A. Kirk

C. J. VAN DALEN
H. C. A. VAN DUUREN
INVENTORS
BY Hugh A. Kirk

Jan. 31, 1961 C. J. VAN DALEN ET AL 2,970,189

ARHYTHMIC TELECOMMUNICATION SYSTEM

Filed July 25, 1956 8 Sheets-Sheet 7

INVENTORS
C. J. VAN DALEN
H. C. A. VAN DUUREN

BY

Hugh A. Kirk
ATT'Y.

INVENTORS
C.J. VAN DALEN
H.C.A. VAN DUUREN
BY
Hugh A Kirk
ATT'Y.

2,970,189

ARHYTHMIC TELECOMMUNICATION SYSTEM

Christiaan J. van Dalen, The Hague, and Hendrik C. A. van Duuren, Wassenaar, Netherlands, assignors to De Staat der Nederlanden, ten deze vertegenwoordigd door de Directeur-Generaal der Posterijen, Telegrafie en Telefonie, The Hague, Netherlands Filed July 25, 1956, Ser. No. 600,028

Claims priority, application Netherlands July 26, 1955

17 Claims. (Cl. 178—23)

This invention relates to a system for the telecommunication of code signals in an arhythmic system and is an improvement based upon the system described in the co-pending U.S. patent application of Hendrik C. A. Van Duuren S.N. 600,001, filed July 25, 1956, but applicable to other systems as well. More particularly, it deals with such a system having automatic error and detection and correction circuits comprising special group indication signals associated with each code signal to insure that only the corrected erroneously received signal, which is repeated until it is received correctly, is recorded or printed and not repeatedly printed at the receiver.

Previously, systems for the automatic error detection and correction have been known, such as those described in Van Duuren U.S. Patent No. 2,703,631 which is based upon a synchronous or rhythmic system.

The system according to this patent works with synchronous means. If in a duplex or two-way communication connection according to this patent between a station A and a station B, station B receives a signal mutilated or not at all, a so-called repetition cycle is initiated. This repetition cycle has a fixed duration. In the repetition cycle the receiver at B is blocked. The transmitter at B gives, as a first signal in the repetition cycle, a warning signal followed by a certain number of signals previously transmitted. On reception of the warning signal a repetition cycle is initiated at A too. The receiver at A is blocked. The transmitter at A gives as a first signal in the repetition cycle a warning signal, followed by a certain number of signals previously transmitted, the last of these signals being the one that was received mutilated at B. The blocking of the receiver at B is removed at the end of the repetition cycle at that station and thus all the signals transmitted by A in its repetition cycle are ignored at B, except the last, and this is the signal the repetition of which had been asked. Among the signals ignored at B there are some signals already correctly received at B. These so-called "undesired" signals must not be printed. As has been explained above, in this synchronous system it is exactly known how long the receiver must be blocked in order to prevent signals previously received correctly (undesired signals) from being printed.

In a system according to the present invention no synchronous means are used. In such a system the problem of preventing undesired signals from being printed cannot be solved in a way as indicated above for a synchronous system.

Accordingly, it is an object of this invention to produce an efficient, economic, effective, arhythmic or non-synchronous telecommunication system for code signals which prevents undesired repeated signals from being printed.

Another object is to produce such a system which removes the imperfections of the multi-element frequency modulator code signal system according to the above mentioned copending Van Duuren application S.N. 600,001, filed July 25, 1956.

Another object is to provide such a system for the automatic detection of the faulty reception of signals, the automatic request for repetition, the automatic repetition of the signals, and the automatic rejection of all but the desired repeated signal which was previously detected to be faulty.

Another object is to provide such a two-way communication system in which the transmitter at one station will be blocked from transmitting a return signal every time a mutilated or no signal at all is received by it from another station.

Another object is to provide such a system having a master station and a slave station which is controlled by the master station.

Another object is to provide a system in which a received signal is not printed or finally recorded until the station transmitting that signal knows that that signal has been correctly received and is not a repetition of the signal which has already been correctly received.

Another object is to provide such a system in which the signals are divided into two or more groups including special group indication signals for determining which group each signal is in, so as to prevent unnecessary repetition or the printing of undesired correctly received repeated signals at a receiver which are not part of the exact sequence of code signals sent out by the transmitter.

Another object is to provide special service signals which are associated or correspond to each signal being transmitted in order to prevent the receiver from printing a repeated signal and also to determine whether the last transmitted signal was received mutilated and should be repeated, or whether the next signal should be transmitted; that is, to determine whether or not the station receiving the special signal is the one which transmitted a signal which was erroneously received or only received a mutilated signal which was correctly transmitted from the other station, thereby determining which of the two stations in the two-way system is to repeat the signal and which of the signals repeated and received are to be printed and which are desired signals and which are not desired signals.

Generally speaking, the system according to the invention is so arranged that in a master-slave connection, the slave station cannot transmit a further signal on reception of a mutilated signal or if no signal is received at all. If during an existing connection the master station receives no signal from the slave station, it is possible that the slave station did not send a signal or that a signal sent by the slave station is not received by the master station. Consequently the master station does not know the cause of the non-reception of a signal, nor does it know whether the last signal sent by it (the master station) was correctly received by the slave station. So in this case, the master station does not know whether it must continue the current communication, or whether the last code signal must be repeated. Therefore, if the master station started repeating as soon as it did not receive a signal from the slave station, there is a possibility that the slave station has already correctly received and printed the signal in question and only the signal sent back to the master station from the slave station has not been received by the master station.

In the non-synchronous system according to this invention, a signal must not be printed at the receiving end until it is certain that this signal is a desired signal and not a repetition of a previous signal already printed (i.e. an undesired signal).

For this purpose, according to the present invention, a group indication is attributed to each of the successive signals transmitted, but during normal undisturbed service this group indication, which is given as a special service signal, need not be transmitted. Thus, this group indication or special signal may for example only be transmitted at: (1) the beginning of a transmission, (2) after an interruption of the communication, and (3) on reception of a mutilated signal or when no signal is received by the master station.

At the receiving end and at the transmitting end local counting devices are provided for determining the group indication for each code signal. On reception of a desired signal, such a local counter steps to its next, other or following group indication position. Thus, the receiver can find out whether a received signal is a repetition of a signal already printed (i.e. an undesired signal) or whether it is a new (or desired) signal.

The above mentioned and other features and objects of this invention and the manner of attaining them will become more apparent and the invention itself will be best understood by reference to the following description of embodiments of the invention taken in conjunction with the accompanying drawings, wherein:

Fig. 1 is a schematic time diagram showing the course of the transmission and the reception in a duplex communication between two stations;

Figs. 2 and 3 are schematic time diagrams for successive code signal letters between two stations in a duplex communication system, such as that shown in Fig. 1, which figures herein show similar developments of a system according to this invention in which the signals to be transmitted are divided into two groups, in which a group indicating signal or special service signal is a complete code signal, and in which at both ends or stations of the connection a transmitting counter and a receiving counter are provided;

Figure 2:
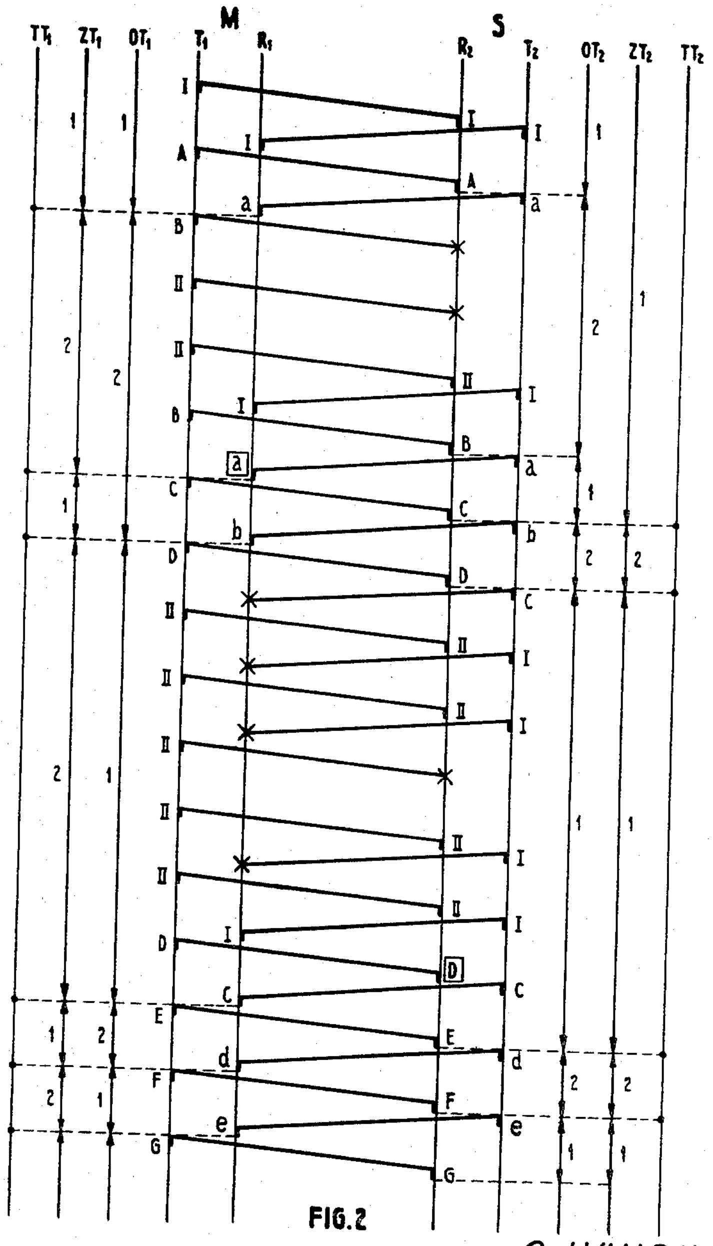
Figure 3:
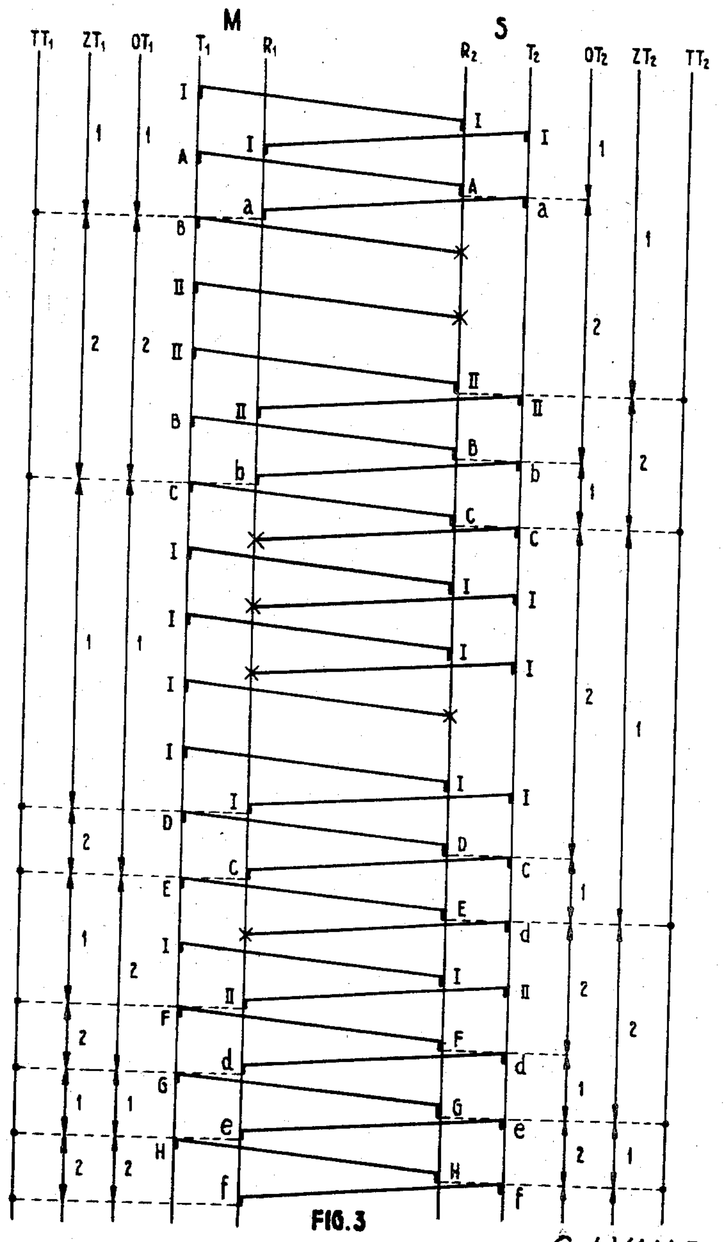
Figure 5:
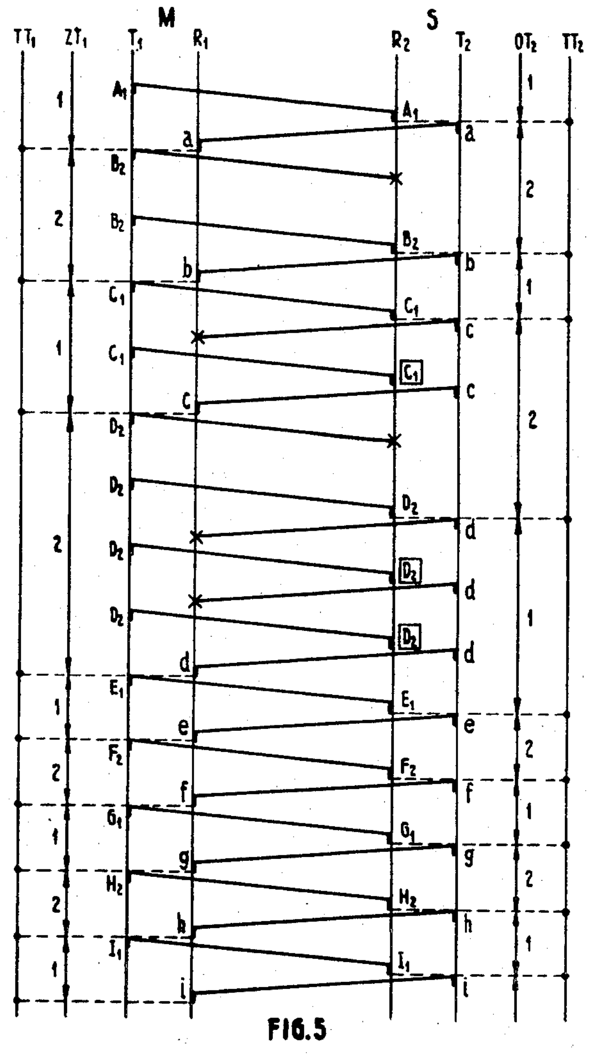
Fig. 5 shows still another time diagram similar to Fig. 4, but for still another embodiment of this invention in which the group indication accompanies as an additional element each signal transmitted by the master station instead of being a complete code signal as in the previous embodiment.
Figure 6A:
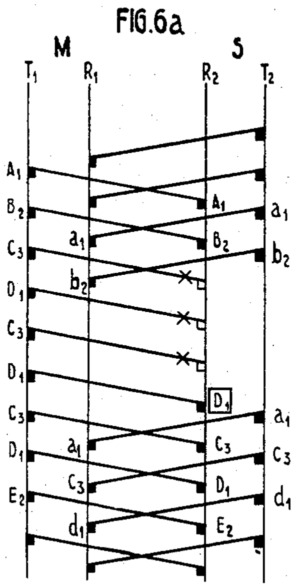
Figure 6B:
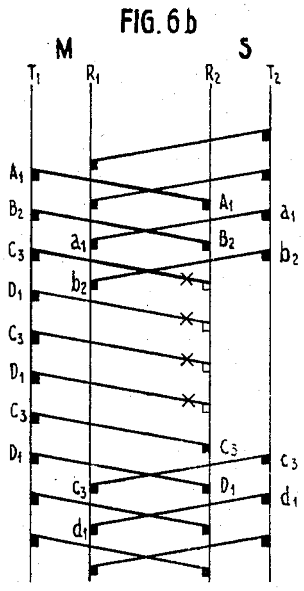
Figure 6C:
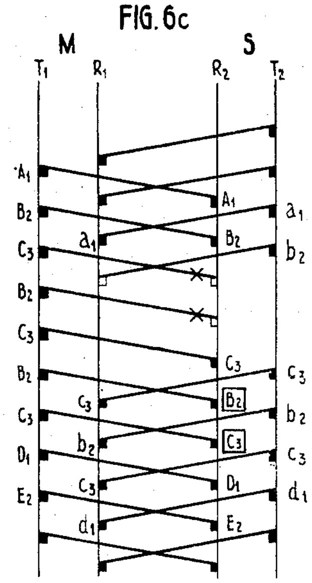
Figure 6E:
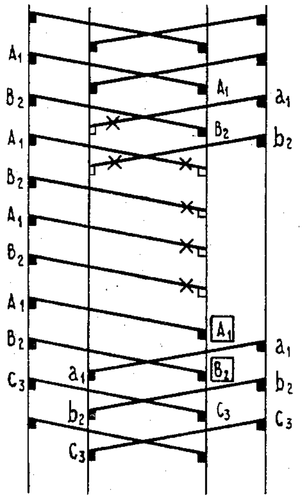
Figure 6F:
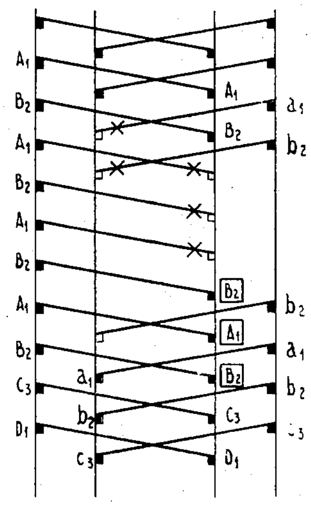
Figure 6D:
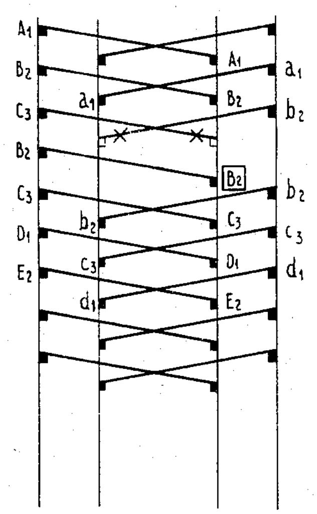
Figure 7A:
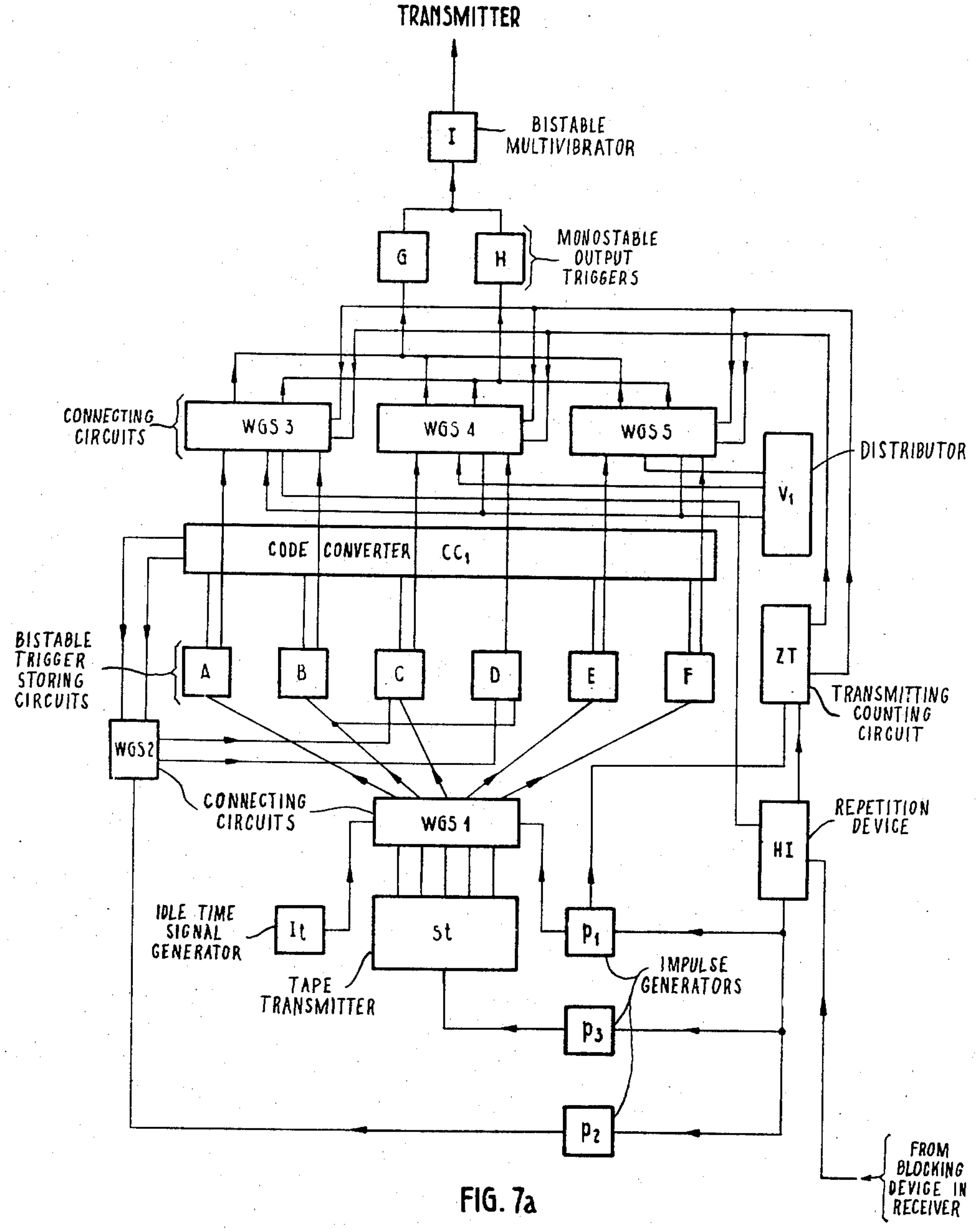
Figure 7B:
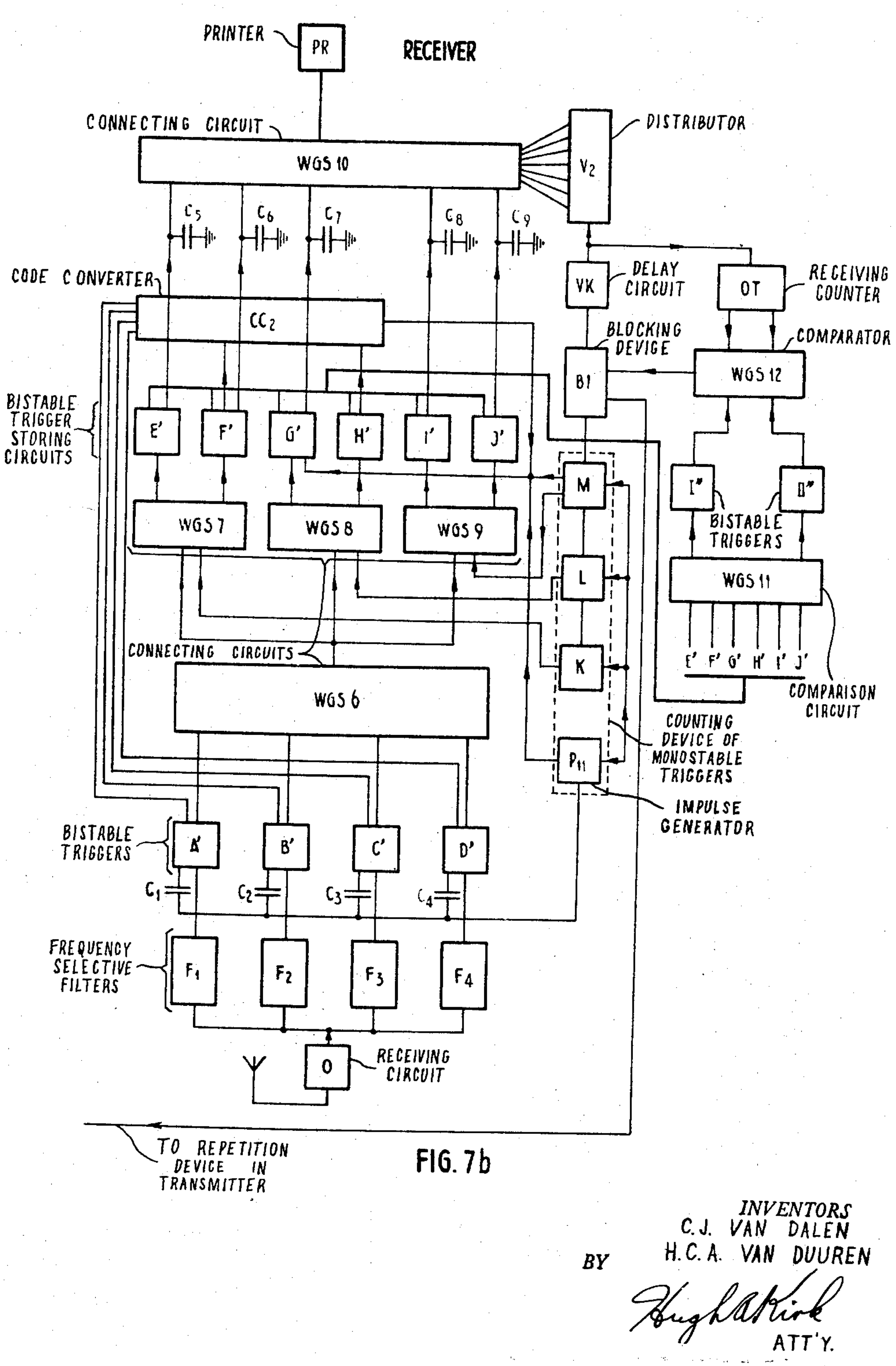

Figs. 6*a* through 6*f* show time diagrams of a development of the system according to Fig. 5 in which a larger propagation time is employed and the two code signals are repeated each time an error is detected, and both stations transmit special signals as additional elements to their code signals; and Figs. 7*a* and 7*b* show a schematic block wiring diagram of an installation according to the system of Figs. 2 and 3, Fig. 7*a* being the transmitter, and Fig. 7*b* being the receiver at the same station.

I. ERROR DETECTION

Figure 1:
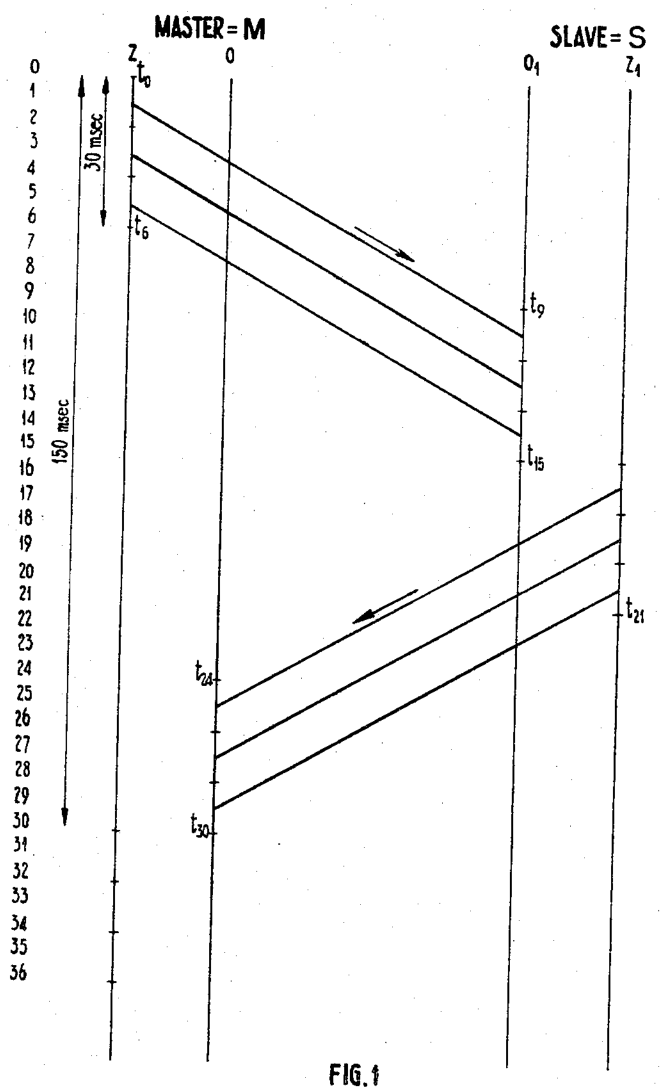

Fig. 1 is similar to Fig. 1 of the above mentioned copending Van Duuren patent application S.N. 600,001, filed July 25, 1956, and is a time diagram showing the course of transmission and reception in a connection in which a master station M transmits messages to a slave station S, station S sending at the same time messages back to station M. The time scale is shown vertically, and under the letter M are two parallel vertical lines Z and O. On line Z are plotted the signals sent by the transmitter at M, and on line O are plotted the signals received by the receiver at M. In like manner two vertical lines are given for station S. On line Z′ are plotted the signal sent by the transmitter at S, and on line O′ are plotted the signals received by the receiver at S.

Suppose M starts transmitting at the moment $t_0$. Each signal consists of three elements; such as the frequency elements of said copending Van Duuren application, the transmission of each element takes 10 ms., (milliseconds) so from times $t_0$ to $t_2$ is 10 ms., etc. After 30 ms. the complete signal has been sent.

In this Fig. 1, the propagation time is assumed to be 45 ms. This propagation time comprises the delay in the apparatus and the time required for the transmission via the radio channel between M and S, so that the first element arrives in the interval between times $t_9$ and $t_{11}$ at the receiver O′ of station S, and the reception of the last element has just ended at the time $t_{15}$.

If the apparatus at station S has observed three frequency starts or changes in frequency, the relevant code signal is considered to be received correctly. If at station S less than three frequency starts have been observed, this is taken as a proof that the relevant signal has been received in a mutilated state. In the former case of correct reception, the equipment at station S is enabled to print the signal, while in the latter case of mutilated reception, this possibility is precluded or printing of the signal is prevented.

Suppose the signal has been received correctly at station S. In that case the transmitter at station S will start the transmission of a signal at moment $t_{15}$ and 30 ms. later (at moment $t_{21}$) the transmission of this signal will have finished. After 45 ms. it will reach the receiver at station M, notably in the interval between times $t_{24}$ and $t_{30}$.

If the signal transmitted by M in the interval between times $t_0$ and $t_6$ is received at station S in a mutilated state, the possibility for station S to transmit a signal is precluded, so that no signal arrives at station M in the interval between times $t_{24}$ and $t_{30}$.

Now the subject matter of the present invention is approached. There is a second possibility that no signal arrives at station M, though station S did transmit a signal i.e. from fading or something like it. From the non-reception of a signal, station M might infer that the last signal sent by it was received at station S in a mutilated state. Consequently, station M will start repeating the relevant signal, to which end this signals is stored in a register, from which it can be re-transmitted. If this repeated signal now arrives correctly at station S, station S can send a signal back to station M again. But, if it does not arrive correctly, station S cannot send a signal back to station M, and M starts repeating again. This process is repeated until the relevant signal is received correctly at station S.

The device that observes correct or mutilated reception and which is responsive to the frequency starts in the signal is similar for both stations. It is necessary with this arrangement that if one of the stations has no more messages to transmit, it starts transmitting service signals or idle-time signals so as to report the correct reception of the signals sent by the counter-station. Thus, the error detection is controlled by the frequency starts occurring at the transition in time from one element to the next in a multi-element frequency modulated signal system such as, for example is described in the copending Van Duuren U.S. patent application S.N. 600,001, filed July 25, 1956.

In the system according to Fig. 1, in which M functions as the Master station and S as the Slave station, station M will always have to send a signal, because otherwise the connection S—M will fall out. Suppose the master station M sends a code signal which is correctly received at the slave station S. S station is now given the opportunity to send a code signal back to station M. Suppose this signal from S is received mutilated or not at all at station M. Now station M does not know whether its lastly transmitted signal was correctly received or not at station S. Therefore, station M starts repeating its lastly transmitted signal, but this signal must not be printed at S. In order to prevent this undesired printing at station S, the apparatus can be so arranged that, if station M receives a mutilated signal or no signal at all, it transmits a special signal, a service signal, before the signal to be repeated is re-transmitted. If this service signal is received at station S, the apparatus at station S will respond thereto by blocking the printing mechanism for the duration of this special signal and the next following or the repeated signal. Thus, a signal already received correctly is prevented from being printed again when being repeated.

Suppose further that the slave station S transmits a code signal which is correctly received at the master station M and that then the master station M transmits a code signal which is received at the station S in a mutilated state or not at all. Slave station S does not now know whether its last transmitted signal is correctly received or not at the master station M. Now since station S has received a mutilated signal or nothing at all, the opportunity is precluded for the transmitter at station S to transmit its next signal or any signal. Thus, the station M receives nothing in return from the station S. Consequently, the station M starts repeating again. To indicate that it is going to repeat, it first transmits a special or service signal and then only the last transmitted code signal. After the correct reception of this special or service signal by station S, station S can again transmit a code signal, but it does not know whether it must repeat its last transmitted code signal or whether it must give the next code signal. Therefore, station S must be able to determine from the received special or service signal whether the signal last transmitted by S was received by station M in a mutilated or in an unmutilated state, in order to determine whether its last transmitted code signal must be repeated or whether a next code signal must be given. This can be achieved by the use of two different service signals.

Therefore, the arrangement according to Fig. 1 only, described above, does not sufficiently guarantee an absolutely correct working of the system. Thus, if within a number of milliseconds after the arrival of the first element of a signal (which entails the observation of a first frequency-start) the station S has observed three frequency-starts, a correct signal has been received and a signal is transmitted by station S. If this has not been the case, S can transmit no signal. At station M a certain lapse of time is counted after the beginning of the transmission of each signal, and then it is ascertained whether a signal comes back from station S. If nothing is received back from station S, the station M starts repeating.

II. GROUP INDICATION SIGNALS

A. *Separate complete signals*

1. FROM BOTH STATIONS

Fig. 2 shows a time diagram of a system according to this invention in which the above mentioned insufficiencies and imperfections of the system according to Fig. 1 have been removed. In this system, the code signals to be transmitted are divided into two groups. By code signals are meant the signals belonging to the international telegraphic code. To these signals do not belong the special or service group indication signals mentioned above and in what follows.

If a first code signal belongs to group I, the next code signal is placed in group II, the third code signal to group I or a different group, etc. For this purpose the receiver and the transmitter at both ends or stations of the connection are provided with a receiving counter and a transmitting counter to associate each code signal with its proper group. The receiving counter steps to a next state or other group on receipt of a correct code signal that was not received before, and the transmitting counter steps to a next state or other group, if after the transmission of a code signal a correct code signal is received. The transmitting apparatus at both stations disposes of special signals, service signals I and II, that indicate to which group the code signal following the service signal belongs.

In Fig. 2, five parallel vertical lines are drawn for the master station M and the slave station S, with the transmitted signals indicated along the lines $T_1$ and $T_2$, respectively, and the received signals along the lines $R_1$ and $R_2$, respectively. The other three vertical lines at each station correspond respectively to the time points for the operation of the tape transmitter $TT_1$ and $TT_2$, the transmitter counter $ZT_1$ and $ZT_2$, and the receiver counter $OT_1$ and $OT_2$.

Station M begins, for example, by transmitting a service signal I (its transmitting counter $ZT_1$ being in state I). This service signal I is correctly received at S. Station S responds to it by transmitting e.g. a service signal I (its transmitting counter is then as a result thereof also in state I). This service signal is correctly received at M. M infers from the reception of a signal from S that its preceding service signal has been correctly received and therefore M transmits a letter now, e.g. an "A." This "A" is associated with and transmitted in group I. This "A" in group I is correctly received at S and as the receiving counter $OT_2$ at S is in state I, the letter "A" is printed. Then the receiving counter $OT_2$ at S changes over to state II. As this "A" has been correctly received at S, S proceeds also to the transmission of a letter, e.g. an "*a*" in group I (the transmitting counter at S still being in state I). This "*a*" is correctly received at M and as the receiving counter at M is still in state I, this letter "*a*" is printed at station M. As a good code signal has now also been received at station M, the receiving counter $OT_1$ steps to the alternative state, in this case state II. As a good code signal has been received after the transmission of a letter, the transmitting counter $ZT_1$ now also changes over to the next state, state II.

Station M infers from the correct reception of the letter "*a*" that its last signal was correctly received at S and proceeds to the transmission of a next letter "B," which belongs now to group II. This letter "*b*" is received at S in a mutilated state, see cross (×) on line $R_2$. The result is that S cannot transmit a next signal. Consequently, station M receives nothing from S and proceeds to the transmission of a service signal II since its transmitting counter $ZT_1$ now is in state II. This signal "II" arrives at S in a mutilated state also. The result is that S cannot transmit a next signal yet. Consequently, station M receives nothing from station S yet, and transmits the service signal II again. This service signal "II" then is correctly received at S, so station S can transmit a signal again and issues a service signal I, its transmitting counter $ZT_2$ still being in state I. As station S has received no acknowledgement of the receipt of its last signal "*a*" from station M, S starts repeating this last signal "*a*" preceded by its associated service signal I. This signal I is correctly received at M and M starts repeating the letter "B," because M is sure now that the group indication II has been received correctly at S. Now this "B" is received correctly at S and since this "B" belongs to group II and the receiving counter $OT_2$ at S is in state II, this letter "B" is printed at S. Then S can send a letter again (its next). However, it repeats its last letter "*a*" in group I beforehand. This "*a*" is correctly received at M, but the receiving counter $OT_1$ at M is in state II, so this repeated letter "*a*" is not printed. (It must not be printed, because it arrived already correctly at the first transmission.) Station M then changes its transmitting counter $ZT_1$ to state I and transmits the letter "C," because it is now sure that its previous letter "B" has been correctly received at S. This "C" is correctly received at S. The receiving counter $OT_2$ at S steps to state II then, and S starts transmitting the next letter "*b*." As the previous letter "*a*" belonged to group I, this letter "*b*" belongs to group II, This "*b*" is correctly received at M, and it is printed too, because the receiving counter $OT_1$ is in state II. The receiving counter $OT_1$ passes to state I now. The transmitting counter $ZT_1$ passes to state II, because a correct letter has been received after the transmission of a letter. Now the transmitter at M starts transmitting the letter "D." This letter "D" is correctly received at S and S transmits its next letter "*c*." This letter "*c*" arrives at M in a mutilated state. Because station M does not know whether its last signal "D" has been correctly received at S, M repeats the letter "D," preceded by its associated service signal; in this case service signal II. This signal II is correctly received at S. Because S does not know whether its last transmitted letter "C" has been correctly received at M, S starts repeating the letter "C," preceded by a service signal, in this case service signal I. This signal I is received at M in a mutilated state. M transmits the service signal II once more then. This signal II is received correctly at S. S responds by transmitting the service signal I again. This "I" is received at M in a mutilated state again. Then M transmits the service signal II. This signal II is received at S in a mutilated state. Now S cannot transmit a signal. Then M transmits service signal II once more. This time it is correctly received at S. Then S transmits service signal I, which is received at M in a mutilated state. Then M transmits service signal II again. This time it is received correctly at S. S then transmits service signal I which is correctly received at M. Then M transmits letter "D." This letter "D" is correctly received at S, but it is not printed, because the receiving counter is in state I and the letter "D" has been transmitted in group II. This letter "D" therefore must not be printed, because it was already received correctly before. Station S transmits the letter "*c*" then, which is correctly received at M. After the above explanation the rest of the Fig. 2 is correspondingly self-explanatory.

Further at the extreme left and at the extreme right of the figure vertical lines have been drawn, on which the moments are plotted at which the tape transmitter $TT_1$ and $TT_2$ at M and S, respectively, produce a next signal from the perforated tape.

In Fig. 2 conditions are such that, if S receives a service signal, be it "I" or "II," S responds by repeating its last transmitted code signal preceded by the service signal pertaining to it, which indicates to which group the code signal to be repeated belongs. This repetition is not always necessary, but in the system according to Fig. 2, code signals are repeated which have already been duly received and printed at M. This applies also to station S. The arrangement is such that such an unnecessarily repeated code signal is not printed. These unnecessary repetitions are avoided in the system according to Fig. 3.

In the system according to the system illustrated in Fig. 3, the apparatus at station S ascertains first, on arrival of a service signal, to which group this signal belongs. The fact is that station S can infer from this datum, whether its last transmitted signal has been received correctly at M, and if it has, it will not repeat a previous signal preceded by its associated service signal, but instead station S will transmit the next signal preceded by the service signal associated with said next signal.

In Fig. 3 the course of the communication is the same as described above for the beginning in Fig. 2. Station S receives successively a service signal I, a letter "A," twice a mutilation and then a service signal II. S can infer from the reception of this service signal II that its last prior letter "*a*" has been correctly received at M; if not, the transmitting counter $ZT_1$ at M would not have passed from state I to state II, since the transmitting counter only makes a step when, after the transmission of a code signal, another code signal also has been correctly received. Thus, the transmission counter $ZT_1$ at M has passed to state II after the correct reception of the letter "*a*," preceded by the transmission of the code signal "A"; and in the system of Fig. 2, S starts repeating, after the reception of the first code signal II, its last letter "*a*" preceded by the associated service signal I, thereby indicating the group to which the letter "*a*" belongs. In Fig. 3 on the other hand, S transmits, after the reception of the first code signal II a fresh or the next letter "*b*" preceded by its associated service signal II, thus avoiding unnecessary repetitions from M to S.

In Fig. 2, after the transmission of the letter "D," the station M received successively: three times a mutilated signal, once nothing, once a mutilated signal, and then a service signal I. Consequently, since after the transmission of the letter "D," M received no correct letter from S, and so station M starts repeating the letter "D," which is unnecessary. In Fig. 3 on the other hand, after the transmission of the letter "C" and station M has received three times a mutilation, once nothing, then a service signal I, instead of repeating the letter "*c*" as would be the case according to the system of Fig. 2, the station M proceeds to the transmission of the next letter "D." Thus, from the reception of the service signal I, station M can infer that its previous signal "C" has been correctly received by the station S.

The fact is that the transmitting counter $ZT_2$ at S in the system of Fig. 3 only passes to a next state after the reception of a correct letter (in this case the "C") following the transmission of a letter (in this case the "*b*"). If S had not received the letter "C" correctly, the transmitting counter $ZT_2$ at S would not have stepped to the next state I. Thus, station M can infer from the fact that it receives a service signal I, that its last letter "C" has been correctly received by S. Consequently, station M proceeds to the transmission of the next letter "D." So in the system according to Fig. 3, unnecessary repetitions which occurred in the system according to Fig. 2, are avoided, and the system of Fig. 3 means a saving of time thereover.

2. FROM MASTER STATION ONLY

Figure 4:
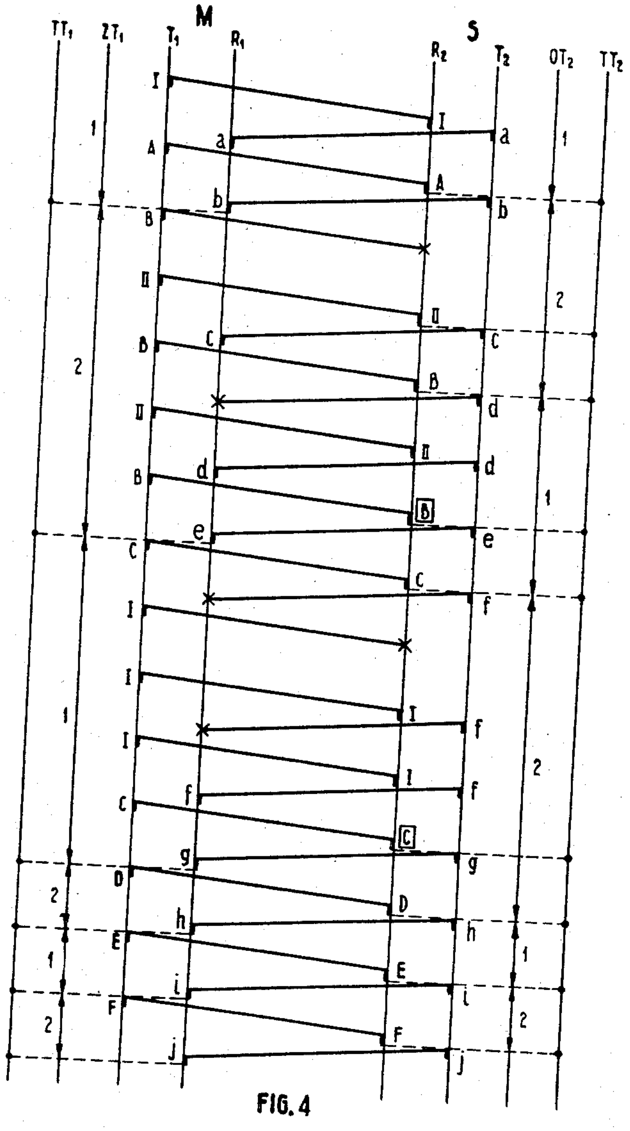
Fig. 4 shows another time diagram for code signals in a duplex system similar to Figs. 2 and 3, but for another embodiment of this invention in which only the master station has a transmitting counter and only the slave station has a receiving counter, and in which only the master station transmits the special service or group indication signals.

In Fig. 4 is a time diagram of the signals for a system which offers improvements and simplifications with respect to the systems according to Figs. 2 and 3. In the system according to Fig. 4, the master station M is only equipped with a transmitting counter $ZT_1$ (so it has no receiving counter), whereas the slave station S has only a receiving counter $OT_2$ (so it has no transmitting counter). The moments at which the transmitting counter $ZT_1$ at M passes to a next state are indicated together with the relevant states on the vertical line $ZT_1$. The moments at which the receiving counter $OT_2$ at S passes to the next state are indicated, together with the relevant state, on the vertical line $OT_2$. The moments at which the tape transmitters offer a next code signal are indicated on the vertical lines $TT_1$ and $TT_2$ for station M and station S, respectively.

The transmitting counter $TZ_1$, as well as the tape transmitter $TT_1$ at M, passes to the next state, if the next signal received after the transmission of the code signal is a correct code signal. The receiving counter $OT_2$ at S passes to the next state if there arrives a correct code signal, providing it is preceded by a service signal (designated in what follows by "the expected service signal" and the associated code signal being called "the expected code signal") of the group following the group to which belonged the service signal received in the preceding period.

The tape transmitter $TT_2$ at S passes to a next state every time a good code signal or the expected service signal is received. If at S a correctly received code signal is not preceded by the expected service signal, or if the code signal does not belong to its proper group, this code signal is not printed.

Further in this improved system of Fig. 4, the master station M transmits code signals and service signals while the slave station S transmits only code signals and no service signals. Station S transmits code signals only after the correct reception of a code signal, and after the correct reception of an expected service signal (which is checked by its receiving counter $OT_2$. If the received service signal is not the expected one, or if the received code signal does not belong to the expected group, station S knows that its last transmitted code signal has not been correctly received at station M; because if it had, the transmitting counter $ZT_1$ at M would have passed to its next state and a service signal of the other group would have been transmitted by M. In consequence, station S starts repeating its last transmitted code signal.

If station M discovers a mutilation in the system of Fig. 4, M does not know whether or not its last transmitted signal has been correctly received at S. If its last transmitted signal was a code signal, M starts repeating this code signal preceded by its associated service signal; while if its last transmitted signal was a service signal, M starts repeating this service signal, followed by the last transmitted code signal. In both cases the repeated code signal is not printed at S, because the printer is blocked if the state of the receiving counter $OT_2$ does not correspond to that state associated with the preceding service signal. Thus, this code signal had already been correctly received and printed at S before, but station M was not in a position to check this correct reception, due to the fact that it received a mutilated signal in answer to this transmitted signal.

Now referring to Fig. 4, the diagram shows first that the station M has transmitted a service signal I, which signal I has been correctly received at S. In answer to this signal I, station S sends no longer a service signal, but it transmits immediately a code signal, i.e. "*a*." This signal "*a*" is correctly received at M. Station M sends its next code signal, viz. the letter "A" belonging to group I. This signal "A" is correctly received at station S and since it belongs to group I and the receiving counter $OT_2$ is in state I, this signal "A" is expected and consequently, it is printed. In station S the receiving counter $OT_2$ passes to the next state now, because a code signal has been correctly received and it belongs to the desired or expected group.

The tape transmitter $TT_2$ at S passes to the next state too, because a code signal has been correctly received. Station S then transmits a code signal "*b*" which signal "*b*" is correctly received and printed at station M. Each code signal that is correctly received at M is printed, because station S cannot make unnecessary repetitions. Station S can deduce from any signal received from station M, be it a code signal or a service signal, whether its last transmitted code signal has been correctly received by station M. Consequently, station S will not repeat itself unnecessarily.

At station M the transmitting counter $ZT_1$ and the tape transmitter $TT_1$ now pass to the next state, because a code signal has been correctly received immediately after the transmission of a code signal. Station M now transmits a code signal "B" which is received at station S in a mutilated state. Now station S cannot transmit a signal and, consequently, station M receives nothing. The non-reception of a signal by station M may have two different causes; either station S has received the last signal from M in a mutilated state, or station S has received and printed the last signal from station M, after which S has transmitted a signal which has not arrived at M. Consequently, station M does not know whether its last transmitted signal has been correctly received at S. Station M then starts repeating its last transmitted code signal "B," preceded by B's then associated service signal II. This service signal II is correctly received at station S. The tape transmitter $TT_2$ at S passes, or steps to its next state or letter to be transmitted, because a service signal of the desired group has been received. The receiving counter $OT_2$ does not yet step to the next state, because the received signal was not a code signal. Station S then sends its next code signal "*c*." This signal "*c*" is correctly received at station M and station M repeats the transmission of the code signal "B," which now is correctly received at station S. Since "B" belongs to the expected group, group II, and the receiving counter $OT_2$ is in state II, the signal "B" is printed. The receiving counter $OT_2$ and the tape transmitter $TT_2$ pass to their next states now. Then station S transmits a code signal "*d*" which is received at station M in a mutilated state. Station M does not yet know now, whether its last transmitted code signal has been correctly received at S and, consequently, repeats this signal "B" again preceded by the associated service signal II. This service signal II is correctly received at S. Then station S repeats the code signal "*d*" which is correctly received at M. Then station M transmits the code signal "B" which is received correctly at S, but it belongs to group II and the receiving counter $OT_2$ at S is in state I, so this signal "B" is not expected and accordingly it is not printed. But station S has received a signal correctly, so its tape transmitter $TT_2$ now passes to its next state, and S then transmits its next code signal "*e*."

This signal "*e*" is correctly received at M. The transmitting counter $ZT_1$ and the tape transmitter $TT_1$ at M steps to the next state, because a correct code signal has been received after the transmission of a code signal. After this station M transmits a code signal "C." This signal "C" is corerctly received at S, in that it belongs to the expected group and consequently it is printed. Then the receiving counter $OT_2$ at S passes to a next state, because a code signal has been correctly received and it belongs to the expected group. The tape transmitter $TT_2$ at S passes to a next state too.

After the foregoing description of Fig. 4, it can be seen from the figure that in station M the transmitting counter $ZT_1$ and the tape transmitter $TT_1$ always make a step simultaneously. This is not the case at station S, where the tape transmitter $TT_2$ sometimes passes to a next state, whereas the receiving counter $OT_2$ does not.

The improvements in the system according to Fig. 4 with respect to the system according to Fig. 3 are: (1) at the master station M the receiving counter is eliminated; (2) at slave station S the transmitting counter is eliminated; and (3) the slave station S transmits no service signals at all.

An inconvenience with respect to the system according to Fig. 4 is that the master station M may repeat itself unnecessarily. This only applies to station M, however, whereas in the system according to Fig. 2 unnecessary repetitions may occur at both stations M and S.

B. *Added element*

1. FROM MASTER STATION ONLY

In Fig. 5 there is illustrated a signal time diagram for still another system in which the separate service signals, indicated to which group belong the code signals following them, are eliminated. In this system the said group indication is incorporated in the code signal itself, and as in the system according to Fig. 4, only the master station M transmits service signals. The code signals of station M thus may be extended by one element, so as to contain four elements instead of three, which fourth element of the code signal indicates the group associated with the signal of the other three elements. The code signals transmitted by the slave station S, just as in the foregoing cases, consist of only three elements each. In this system too, the rule applies that within each signal each successive element must have another frequency than the preceding element. Further in the example according to Fig. 5, group I is indicated either by frequency $\phi 1$ or by frequency $\phi 2$, group II being indicated either by frequency $\phi 3$ or by frequency $\phi 4$. This system of Fig. 5 also saves time or is faster than the other herein described systems, because no separate service signals are transmitted which occupy as much time as a code signal. Also in the system of Fig. 5, the group indication or number is transmitted behind its associated code signal and not before it as in the other above described systems.

In the system according to Fig. 5 the transmitting counter $ZT_1$ and the tape transmitter $TT_1$ of the master station M both pass simultaneously to a next state after the correct reception of a code signal as in the system of Fig. 4. The receiving counter $OT_2$ and the tape transmitter $TT_2$ of the slave station S also both pass simultaneously to a next state after the correct reception of a code signal, providing this signal belongs to the expected group, which was not the case in the system according to Fig. 4. Consequently, this is also an advantage of the system according to Fig. 5, because the stepping action of the two devices can now be commanded by one and the same datum.

Referring to Fig. 5, there is shown that station M transmits a code signal "A" provided with the group indication I (the transmitting counter being in group I). This signal "A" is correctly received at station S where both the receiving counter $OT_2$ and the tape transmitter $TT_2$ pass to a next state, because a letter of the expected group has been received, and the receiving counter $OT_2$ was in state I. Then station S transmits a code signal "*a*" which is correctly received at station M. At station M the transmitting counter $ZT_1$ and the tape transmitter $TT_1$ pass to a next state now, because a code signal has been correctly received. Next station M transmits a code signal "B," provided with the group indication II. This code signal "B" is received at S in a mutilated state and station S thus cannot transmit a signal now, and consequently station M receives nothing back. Station M does not know then whether its last transmitted code signal "B" has been correctly received at S and starts repeating this signal "B." This time "B" is correctly received at station S, and since "B" belongs to group II and the receiving counter $OT_2$ at S is in state II, it is also printed.

At station S the receiving counter $OT_2$ and the tape transmitter $TT_2$ now pass to a next state and station S transmits a code signal "*b*" which is correctly received at M so that station M, the transmitting counter $TT_1$ and the tape transmitter $TT_2$ pass to a next state. Then station M transmits a code signal "C" which is correctly received at station S. Next station S transmits a code signal "*c*" which is received at station S in a mutilated state. Station M then starts repeating its last transmitted signal "C" which is correctly received at station S, but because it belongs to the group that is not expected, in this case group I, and the receiving counter $OZ_2$ at S is in state II, it is not printed. Then station S repeats a code signal "*c*" which is correctly received at station M. Then station M transmits a code signal "D" which is received at S in a mutilated state. Station S can send no signal then, so consequently station M receives nothing. Then station M repeats its last transmitted code signal "D" which is correctly received at station S, and since it belong to the expected group, it is printed. The rest of Fig. 5 is explained similarly.

2. FROM BOTH STATIONS

Figs. 6 schematically illustrate signal time diagrams of a system in which a longer propagation time for the signals is provided. In the foregoing systems the propagation time is—

$$\frac{150 \text{ milliseconds less twice the time required for the transmission}}{2}$$

milliseconds for each station, with only one signal which must be stored in the register or memory device with a view to a contingent repetition. While in the system according to Fig. 6, the propagation time is—

$$\frac{\text{two times (150 milliseconds less twice the time required for the transmission)}}{2}$$

milliseconds for each station, in which two signals must be stored in the register at all times for possible repetition.

Generally speaking, also in the systems of Figs. 6, the slave station S is so arranged again that code signals that are correctly received and that do not belong to the desired group are blocked, so these signals are not printed. Furthermore the slave station S is so arranged in this system, that on receipt of a code signal provided with a group indication, a code signal is returned provided with a group indication of the same group as the signal received. After the detection of a mutilation or if no signal is received, the transmitter at the master station M starts repeating the last two signals it has transmitted, its receiver being blocked for the time of two signals, i.e. the signals received in that interval are not printed. After the good reception of a signal has been established, the transmitter of the master station M proceeds to the transmission of the next code signal. Also, the number of group indications has been extended from two to three, viz. 1, 2 and 3.

Referring to Fig. 6*a*, the transmitter of the master station M transmits successively a letter "A" belonging to group I and a letter "B" belonging to group II. These signals are duly received at the slave station S. After this, station M transmits a letter "C" belonging to group III. This letter "C" is received at S in a mutilated state. As a result of this, the transmitter at S cannot transmit a signal. Station M receives nothing in consequence and blocks its receiver for the duration of two signals. Meanwhile the transmitter at M has still transmitted the letter "D," belonging to group I. This signal "D" also is received at S in a mutilated state. Then the transmitter at M starts repeating its last two signals transmitted viz. "C" and "D." Of these two signals only "C" arrives at station S in a mutilated state, "D" being duly received. This letter "D" is not printed, however, because it does not belong to the expected group. The last received signal belongs to group II, while a signal is expected belonging to group III, so consequently the correctly received letter "D" belonging to group I is not printed.

Since the slave station S has received a letter "D" belonging to group I, it starts transmitting in its turn a letter belonging to group I which happens here to be the letter "*a*." This letter "*a*" is correctly received at station M, but it is not printed, because the receiver $R_1$ at M is blocked. Meanwhile the transmitter at M has started repeating letters "C" and "D" again, i.e. the third time. The former letter "C" now is correctly received at S, in that it belongs to the expected group III and is printed. The letter "D" is also correctly received at S, and since it belongs to the next expected group, it also is printed.

Thus in Fig. 6*a* is illustrated a case in which the receiver at station S detects successively three times (i.e. an odd number of times) a mutilation, whereas the receiver at M detects no mutilations.

In Fig. 6*b* a case is illustrated in which the receiver at S detects selectively four times (i.e. an even number of times) a mutilation, whereas the receiver at M detects no mutilations. Station M receives successively the letter "*a*" and the letter "*b*," and then it receives for the first time nothing. The reason thereof is that station S has received the letter "C" from station M in a mutilated state and, consequently, is not in a position to send back a signal. Station M blocks its receiver for the duration of two signals, and starts repeating the last two signals, "C" and "D," transmitted by it. These signals "C" and "D" arrive at the station S in a mutilated state. Station S is still not in a position to send back a signal. Station M blocks its receiver again and starts repeating the letters "C" and "D" again. This time letters "C" and "D" are received correctly, and since they belong to the expected groups, they are printed.

In Fig. 6*c* is illustrated a case in which the receiver at station M detects once (an odd number of successive times) a mutilation, and the receiver at S detects successively twice (an even number of times) a mutilation. Station M receives successively a letter "*a*" and a mutilation. Then it blocks its receiver for the duration of two signals and starts repeating its two last transmitted signals ("B" and "C"). The letter "B" is received at S in a mutilated state, but the letter "C" is received correctly, and since it belongs to the expected group, it is printed. During the first period in which the receiver at station M is blocked, M receives successively once a mutilation (mentioned above) and once nothing. After this station M receives nothing again, blocks its receiver once more, and repeats the letters "B" and "C" again. These signals "B" and "C" are correctly received at S but they do not belong to the expected groups and consequently neither one is printed. After the reception of the letter "B" belonging to group II, station S also transmits a letter belonging to group II; this is the letter "*b*." After the reception of the letter "C" belonging to group II, station S also transmits a signal belonging to group II; this is the letter "*c*"; etc.

In Fig. 6*d* a case is illustrated in which the receiver at station M as well as the receiver at station S detect once (an odd number of times) a mutilation. Station M receives successively a letter "*a*" and a mutilation. The reception of the mutilation at M blocks its receiver for the duration of two signals and starts repetition of the letters "B" and "C." The letter "B" is correctly received at S, but does not belong to the expected group and is not printed. On receipt of this letter "B" belonging to group II, S transmits also a letter belonging to group II; this is the letter "*b*." This letter "*b*" is correctly received at M, and since it belongs to the expected group, it is printed; etc.

In Fig. 6*e* another case is illustrated in which the receiver at station M detects successively twice (an even number of times) a mutilation, and the receiver at S detects successively four times (an even number of times) a mutilation. Station M receives a mutilation, then blocks its receiver for the duration of two signals and starts repeating its last two transmitted signals, letters "A" and "B." Both these signals are received at station S in a mutilated state. During the interval when station M blocks its receiver for the first time, it receives a first mutilation (already mentioned) and a second mutilation. Immediately thereafter M receives no signal. (Station M responds to the non-reception of a signal in the same way as to the reception of a mutilation.) Then station M blocks its receiver again for the duration of two signals and recommences the repetition of the letters "A" and "B." Again both signals are received at station S in a mutilated state. Station M still receives no signal from S, blocks its receiver for the third time, and starts repeating the letters "A" and "B" once more. This time these two signals "A" and "B" are received correctly at station S; but they are not printed, because they do not belong to the expected groups. Then station M transmits the letter "C." This signal is correctly received at S. and because it belongs to the expected group, it is printed.

In Fig. 6*f* a still further case is illustrated in which the receiver at station M detects successively twice (an even number of times) a mutilation, and the receiver at S detects successively three times (an odd number of times) a mutilation. Again the system operates in accordance with the cases described above.

Thus, also in this system of Figs. 6, the detection of mutilations and the repetition proceed correctly, only the right and desired signals are printed, and the printing of unnecessarily repeated signals is avoided. Also, from what has been said with regard to Figs. 1 to 6, the maximum propagation time is related to the number of group indications that are used.

III. STATION CIRCUITS

Fig. 7 shows a schematic general block wiring diagram of an installation circuit according to the invention, most particularly adapted, by way of example, for the system described above and illustrated in Fig. 2. According to this system of Fig. 2, there are shown in the diagram of Fig. 7, not only all of the circuits disclosed in said copending Van Duuren U.S. patent application S.N. 600,001, filed July 25, 1956, for a frequency modulated multi-element code system, but also a transmitter counter circuit ZT and a receiver counting circuit OT, a transmitter repetition device HI, and a comparison circuit of device WGS11, WGS12 and triggers "I" and "II" connected with the receiving counter OT for determining the associated group of those signals which are received associated with their special group indication signals, so as to determine whether or not a signal must be repeated, printed, or blocked. These additional circuits employed in the systems of Figs. 7*a* and 7*b* of this invention are made up of the basic trigger circuits and resistor-rectifier combinations specifically disclosed in said copending Van Duuren et al. U.S. patent application S.N. 600,001, filed July 25, 1956. However, before describing the function of these additional circuits for automatic error detection and correction involved in the present invention, a brief review of the operation of specific multi-element frequency modulated code signals of said prior copending Van Duuren patent application S.N. 600,001, filed July 25, 1956, will be discussed.

Thus, the operation of the circuits shown in Figs. 7*a* and 7*b* are now described in accordance with the specific embodiments disclosed in the time signal diagram of Fig. 2, in which both a transmitter counter and receiver counter and comparison circuit are employed together with a system in which a complete separate service or group indication signal is transmitted before each signal is repeated, when a mutilation or no signal at all has been received by one of the stations.

A. *Transmitter*

Referring now to Fig. 7*a*, the transmitting part of the system comprises among other parts, a tape transmitter *St* which steps under the control of an impulse generator $P_3$. At each step, a telegraphic code perforated tape is advanced one step to present for scanning the next five units or elements of a perforated code signal. The five output terminals of the tape transmitter are each connected via a resistor-rectifier combination or connecting circuit shown in the box WGS1 to separate bistable triggers A, B, C, E and F, respectively. The moment when the five elements are passed from the tape transmitter *St* to the trigger input terminals, is determined by the impulse generator $P_1$. A sixth element is formed in trigger D, which element is derived from the second element that already has been stored in the second trigger B.

It is a general rule that if the second element in the five units signal is a marking element, the fourth element in the six units signal will be a spacing element, and conversely. In this manner 24 of the 32 code signals are converted from five units signals into six units signals leaving 8 code signals which must still be converted in a special way. However, it is also necessary that in the six units signal to be formed, that the combination of the 3rd–4th element is not similar to the combination of the 1st–2nd element or of the 5th–6th element. This special rule is connected with the manner in which, at the receiving station, the signal is checked for correct transmission and reception. Correspondingly, at the receiver this six units code must be reconnected to the five unit telegraphic code before it can be printed. Here again, in accordance with the general rule, 24 code signals immediately satisfy the said special rule while the remaining 8 signals must still undergo a supplementary treatment.

This special treatment or code conversion in the transmitter is effected by a code converter circuit $CC_1$. The input terminals of this code converter $CC_1$ are connected to the output terminals of the five triggers A, B, C, E and F. The code converter $CC_1$ contains resistor-rectifier combinations. The output terminals of this code converter $CC_1$ are connected via a resistor-rectifier combination or connecting circuit WGS2 to the input terminals of triggers C and D. The code conversion is under the control of the impulse generator $P_2$. The output terminals of triggers A to F are connected in pairs via three resistor-rectifier combinations or connecting circuits WGS3, WGS4 and WGS5 to monostable triggers G and H. This is done under the control of a distributor $V_1$. The combinations of the 1st–2nd element, 3rd–4th element and 5th–6th element are thus successively passed to triggers G and H.

Each combination of such pairs of elements produces one of four different voltages at the output terminals of triggers G—H, and each pair of elements causes a different voltage value than that of the preceding pair. These voltages are then successively applied to a multivibrator I, which thus delivers at its output terminal a different one of four frequencies for each different voltage or element combination or pair. In this manner the signal is converted in a second operation from a six units signal into a three units signal. A radio transmitter then may be modulated with the voltages appearing at the output terminal of bistable multivibrator I. If there are no more messages to be transmitted and if in the incoming direction messages continue to arrive, the transmitter starts transmitting so-called "idle-time" signals. This is done by means of the device I*t*, which takes the place of the tape transmitter S*t*.

Furthermore, this transmitting installation contains a so-called transmitting counter ZT, which comprises a trigger and a number of resistor-rectifier combinations similar to those described in detail in said copending Van Duuren patent application S.N. 600,001, filed July 25, 1956. It is, among other things, the task of the transmitting counter ZT to pass to a next state or group indication, if two conditions are satisfied, viz.: (1) that a code signal has been transmitted; and (2) that a correct code signal has been received. To this end the transmitting counter ZT is connected to the impulse generator $P_1$, which delivers impulses under the control of a repetition device HI. The repetition device HI is under the control of the blocking device BI in the receiver (see Fig. 7*b*, which is described later).

If a code signal is received in the receiver in a mutilated state or if a special signal or group indication service signal arrives at the receiver (which means a request for a repetition), the blocking device BI operates into its blocking state and passes a command impulse to the repetition device HI, which in turn and among other things, prevents the impulse generators $P_1$ and $P_3$ from delivering impulses. As a result of this, the transmitting counter ZT and the tape transmitter S*t* cannot step to their next states. Impulse generator $P_2$ is also prevented from delivering an impulse and accordingly the code conversion $CC_1$ is also stopped.

If a correct code signal arrives at the receiver, the blocking device BI operates into its non-blocking state. In this case the repetition device HI does not become operative, and impulse generator $P_1$ can pass an impulse to the resistor-rectifier combination circuit WGS1 and to the transmitting counter ZT. The impulse going to the circuit WGS1 causes a next signal to be scanned from the tape transmitter S*t*. The impulse going to the transmitter counter ZT causes the transmitter counter to make a step or change into its other state. If a mutilated signal is received, or a special or group indication service signal is received, the transmitter counter ZT cannot make a step, as has been described above.

It is a further task of the transmitter counter ZT to cooperate in transmitting a service signal corresponding to the state of the trigger in the transmitter counter, which trigger consists mainly of two tubes. This trigger delivers at its anode output terminals two potentials, a high one and a low one. On receipt of a first impulse at the input terminal, the anode of the first tube has e.g. a high potential and the anode of the second tube a low potential. On receipt of a next impulse at the input terminal, the anode of the first tube has a low potential and the anode of the second tube a high potential. These potentials are applied to the resistor-rectifier combinations WGS3, WGS4, and WGS5, and represent either a service signal I or a service signal II, according to the state of the trigger. The repetition device HI, which controls the resistor-rectifier combinations WGS3, WGS4, and WGS5, determines whether the potentials applied by the transmitter counter ZT to the devices WGS3, WGS4 and WGS5 must be converted into a service signal, after which the relevant service signal passes on via triggers G and H and multivibrator I to the radio transmitter.

B. *Receiver*

The signals transmitted by a transmitter of the distant station arrive at receiver O (see Fig. 7*b*). Since the signals are built up by means of four frequencies, the receiver O is connected to four filters $F_1$ to $F_4$, each of which is selective for one of the received frequencies.

The output terminals of the four filters $F_1$–$F_4$ are connected to the input terminals of bistable triggers A′ to D′, respectively. The frequency occurring at a certain moment is passed by the filter designed for it to the trigger connected to this filter, namely triggers A′ to D′, respectively. Then at an output terminal of this trigger, an impulse is passed via a capacitor ($C_1$ to $C_4$, respectively), to a monostable impulse generator $P_{11}$ of a counting device which further contains monostable triggers K, L and M. Further each of the triggers A′ to D′ is connected by an output terminal to a resistor-rectifier combination or connecting circuit WGS6. The output terminal of device WGS6 is connected via a number of resistor-rectifier combinations or connecting circuits WGS7, WGS8 and WGS9 to the input terminals of bistable storing triggers E′ to J′. The working of the counting device $P_{11}$—KLM is such that the first arriving element of a signal operates the trigger K, the second element trigger L, and the third element trigger M. The first element is applied through trigger K to trigger combination pair E′—F′. The second element is applied through trigger L to trigger combination pair G′—H′. The third element is applied through trigger M to trigger combination pair I′—J′. Thus the complete signal is stored and converted into the six units code again, in the triggers E′ to J′. Of 28 signals, the original five units code signals are recovered by simply omitting the fourth element of the six unit code. Of four of the six units signals, the third element must first be converted, which is done by means of a code converter $CC_2$ (as has been described elaborately in the above-mentioned copending Van Duuren U.S. patent application S.N. 600,001, filed July 25, 1956). This code converter $CC_2$ is connected to the output terminals of triggers F′ and H′ and of triggers A′ to D′, and to an input terminal of trigger G′, to which the third element of the six units code is applied. The input terminal of trigger G′ is further connected to a delayed output terminal of trigger M. Thus the change-over of trigger G′ requires the cooperation of trigger M. This is in order to prevent trigger G′ from changing over to an arbitrary impulse from $P_{11}$ and for the code converter $CC_2$. Further the output terminals of the triggers E′, F′, G′, I′ and J′ are connected to capacitors $C_5$ to $C_9$, respectively, and to a resistor-rectifier combination or connecting circuit WGS10.

The resistor-rectifier device WGS10 is controlled by a distributor $V_2$. Here the complete signal is formed, preceded by a start element and followed by a stop element, and passed to the printer PR. The distributor $V_2$ is controlled by the blocking device BI via a delayed output terminal of this device such as the delay circuit VK. The blocking device is normally in the blocking condition and only on receipt of an impulse from trigger M is it temporarily operated into its non-blocking state. In the blocking state of BI, the distributor $V_2$ is stopped and the signal is not passed to the printer. If trigger M gives an impulse, this is a proof of the correct reception of the relevant signal and that the counting device $P_{11}$—KLM has counted until three, which means that all three frequency modulated elements of the signal have been correctly received and recorded. The blocking circuit BI then changes to its non-blocking state, and permits the distributor $V_2$ to send the relevant signal to the printer.

The output terminals of all of the triggers E′ to J′ are further connected to a resistor-rectifier combination WGS11 of a comparison circuit for the special or group indication signals, which device WGS11 is connected to two triggers I″ and II″. If now a service signal I arrives, this signal is led via device WGS11 to trigger I′, while a service signal II is led to trigger II″. These two triggers I″ and II″ are connected to another resistor-rectifier combination or comparator WGS12, to which they apply certain potentials.

A receiving counter OT is also connected to the comparator WGS12 and applies certain potentials to it, too. This receiving counter OT contains among other things two triggers, and has the task of (1) only to allow a "desired" signal to be printed, and (2) to step further after the reception of a "desired" signal (a "desired" signal is a correct signal not yet received before). Thus, an impulse from the blocking device BI via a delay circuit VK to control the distributor $V_2$ also controls the receiving counter OT.

If a service signal I or II is received unmutilated, an impulse goes from the last trigger M of the counting device $P_{11}$—KLM to the blocking device BI, which responds by operating to its non-blocking state, and by giving an impulse via the delay circuit VK to the receiving counter OT and the distributor $V_2$. This service signal must not be printed. The received service signal arrives at one of the two triggers I″ or II″. At this moment such potentials are applied to the resistor-rectifier combinations or comparator WGS12, that from this comparator WGS12 an impulse passes to the blocking device BI, causing it to return to its blocking state, before the distributor $V_2$ is started via the delay circuit VK. The start of distributor $V_2$ is therefore not forthcoming, so that nothing is printed. The impulse passing from the blocking circuit BI via the delay circuit VK to receiving counter OT also is counteracted and has no effect in the receiving counter OT either; and this counter OT makes no step. Now the states of trigger I″ and II″ are compared with the unchanged or prior states of the two triggers in the receiving counter OT. This is done in comparator device WGS12, in which the potentials of the two terminals are compared. If there is no agreement, this means that the next code signal is undesired, and again an impulse passes from comparator WGS12 to the blocking device BI, as a result of which the code signal is prevented from being printed and the receiving counter OT still cannot step to its other or next state.

C. *Adaptations*

Substantially the same block wiring diagram of circuits shown in Figs. 7*a* and 7*b* are also employed for the other embodiments of the circuits disclosed in Figs. 3 through 6 described above. However, each of these other separate embodiments of the invention require some slight obvious changes to those skilled in the art, either in the circuits inside the blocks disclosed or the addition or elimination of the same block circuits.

Referring first to the system described with Fig. 3, as distinguished from that of Fig. 2, the only changes for Fig. 3 would occur in the connections within and between the receiver blocking circuit BI and the comparator circuit WGS12 shown in Fig. 7*b*. The elimination of the unnecessary repetition of code signals and special service signals in this system according to Fig. 3, enables a shortening of the time of a given communication containing mutilations over that time required for transmitting the same communication and mutilations according to the system of Fig. 2.

Regarding the embodiment described in combination with Fig. 4 wherein only the master station M sends out special service signals I and II, there is not required the receiving counter OT or comparison circuits in the receiver of the master station M, nor is there required the transmitting counter ZT in the transmitter at the slave station S. This elimination of sending back special signals from the slave station S is accomplished as previously described above for the embodiment of Fig. 4 by the operation of the comparison circuits, whereby the slave station S is able to determine whether or not from the first special signal transmitted from the master station M, whether or not the master station M correctly received its last transmitted signal or not, and whether or not the slave station S must repeat its last transmitted signal or may transmit its next signal.

Regarding the adaptation of the circuit shown in Figs. 7*a* and 7*b* to the embodiment disclosed and described together with the time diagram of Fig. 5, wherein no separate complete special signals are provided, but instead each code signal is provided with an additional special group indicating element when it is transmitted from the master station, there are required the following changes in the circuits shown in Figs. 7*a* and 7*b*: at the master transmitter station M there is required an additional resistor-rectifier combination, such as WGSS (not shown) similar to those of WGS3, WGS4 and WGS5 which would be controlled by the triggers in the transmission counter ZT and distributor $V_1$ to produce the fourth special group indication signal element which is to be added to each of the code signals transmitted from the transmitter circuit of Fig. 7*a*. Also in the master station M, there would not be required the receiver counter OT, nor the comparison circuits associated therewith as shown in Fig. 7*b*, as for the embodiment described in Fig. 4 above, in that the slave station S does not return any special service signals which must be detected or compared at the master station.

Regarding the slave station S for the system of Fig. 5, there would be required an additional trigger circuit, such as N (not shown), in the counting device $P_{11}$—KLM for counting the special fourth element of each signal from the master station, which trigger N would be connected to resistor-rectifier combination WGS11 (instead of having each of the triggers E′ through J′ connected thereto), as well as to the resistor-rectifier combination WGS6 (similar to that provided for controlling the devices WGS7, WGS8 and WGS9 shown in Fig. 7*b*). Furthermore, in the slave station S there would not be required the transmitter counter ZT shown in Fig. 7*a*, in that no special signals or signal elements are transmitted back to the master station M, as for the embodiment described in Fig. 4 above.

Regarding the adaptation of the circuits of Figs. 7*a* and 7*b* for the system described in Figs. 6, there would be several modifications including some of those just above mentioned for the system of Fig. 5 together with the fact that both receiver and transmitter counter OT and ZT would be provided at each of the stations. Since the system of Figs. 6 require a longer propagation time than that of the prior mentioned systems, duplication of circuits are needed for the storage of two complete signals at the master station M. This is required because two signals are repeated from the master station M each time an error is detected. There would also be required an additional resistor-rectifier combination, such as WGSS similar to that described for the system of Fig. 5 mentioned above, controlled by the transmitter counter ZT to produce the fourth element for each of the signals sent out by the master station M. Furthermore a third trigger in the transmitter counter ZT is required for the third group indicating signal element which is to be generated, in that as previously described there are three separate group indication signals for this embodiment instead of two as for the other embodiments described herein. Also there should be required connections from the repetition device HI to repeat successively the second and first prior stored signals, in that a double repetition of the last two transmitted signals is given each time an error is detected by the master station M. Furthermore, there is required a means for blocking the master receiver circuit from receiving any signals when a repetition is being made, so that undesired signals will not be recorded at the receiver of the master station.

Regarding the revisions of the circuits shown in Figs. 7*a* and 7*b* at the slave station S in accordance with the system of Figs. 6, there is also required an extra trigger circuit such as N in the counting device of $P_{11}$—KLM for the special fourth element which is connected to the resistor-rectifier device WGS11 instead of to triggers E′ through J′ as described above for the circuit of Fig. 5. Again an extra trigger circuit III″, similar to the trigger circuits I″ and II″, and controlled by the device WGS11 would be required for this third special element which in turn is connected to the comparator circuit WGS12. Also, the receiver counter OT would require an additional trigger for comparing the third group indication signal in the comparative circuit WGS12. There also would have to be added an extra trigger to the transmitter counter ZT at the slave station S for the fourth element which corresponds to one of the three special signals that is repeated back to the master station M, which would be under the control of the comparator circuit WGS12, but not controlled by the impulse generator $P_1$ (see Figs. 7*a*) in that according to the system of Figs. 6 the fourth element on each signal which is sent back to the master station from the slave station must correspond to the special signal element of the signal last received by the slave station from the master station, and the slave station does not therefore generate its own special signal elements. This enables the master station M to determine where the mutilation occurred and to prevent some unnecessary repetition of signals. However, according to this system, since two signals are repeated by the master station each time an error occurs, there is obviously some repetition and a means is provided for the operation of the blocking circuit B1 in the receivers at each station to prevent the printing of undesired correctly received signals as described in Section II–B–2 above.

Accordingly, the basic circuits of this invention in combination with the details thereof disclosed in copending Van Duuren U.S. patent application S.N. 600,001, filed July 25, 1956, can readily be adapted for general application of the automatic error detection and correction systems of the present invention.

While there is described above the principles of this invention in connection with specific apparatus, it is to be clearly understood that this description is made only by way of example and not as a limitation to the scope of this invention.

What is claimed is:

1. An automatic error detection and correction device for frequency modulated multi-element code signals in a two-way arhythmic telecommunication system between two stations, each station having a receiver and a transmitter, said device comprising: means connected to the transmitter of at least one of said stations including means for generating signals and associating successive signals with different indications, means connected to the receiver of at least the other of said stations including means for receiving signals and including means for determining the indication associated with each signal received thereby, means connected to said receiving means for printing received signals, and means connected to said receiver and also connected to and responsive to said indication determining means including means for determining whether or not a received signal is to be printed by said printer.

2. A system according to claim 1 wherein said means for determining the indication associated with each received signal comprises a trigger circuit corresponding to each different indication and a resistor-rectifier combination associated with said trigger circuit.

3. A system according to claim 1 wherein said means connected to said transmitter for associating signals with different indications comprises trigger circuits.

4. A system according to claim 1 where only two different types of indications are provided.

5. A system according to claim 1 wherein three different types of indications are provided.

6. A two-way telecommunication system for code signals between two stations each having a receiver and a tranmitter, comprising: means connected to the transmitter of at least one of said stations and including means for generating and associating successive signals with different indications, means connected to the receiver of each station for testing each signal transmitted from the other station for faulty reception, means connected to said testing means for requesting repetition by the other station of the signal tested to be faulty, means connected to the transmitter of each station and connected to said repetition requesting means in the receiver at that station for repeating the transmission of a signal in response to said repetition requesting means, means connected to the receiver of at least the other of said stations for determining the indication associated with each signal received thereby, and means connected to and responsive to said indication determination means including means for determing whether or not a repeated signal is the one which was requested to be repeated.

7. A system according to claim 6. wherein the code signals are multi-element signals having different adjacent frequency elements, and wherein said means for testing each signal comprises a counting device which counts the number of frequency alterations in a signal.

8. A system according to claim 7 including means connected to said counting device for performing the counting of said counting device within a given period of time.

9. A system according to claim 6 including printing means connected to the receiver at each station, and means for blocking said printing means connected and responsive to said means responsive to the said indication determining means so that only the next correctly received signal will be printed.

10. A system according to claim 6 wherein said means connected to the transmitter for generating and associating successive signals with different indications comprises a counting means.

11. A system according to claim 6 wherein said means connected to the receiver for determining the indications associated with each signal comprises a counting means.

12. A system according to claim 6 wherein both said stations include: said means connected to their transmitter for generating and associating successive signals with different indications, and both include said means connected to their receiver for determining the indication associated with each signal.

13. A system according to claim 6 wherein said means connected to the receiver responsive to said indication determining means includes a comparison circuit.

14. A system according to claim 6 wherein said means connected to the transmitter for generating and associating successive signals with different indications comprises means for generating special identifying signals corresponding to each signal.

15. A system according to claim 14 including means connected to said transmitter for transmitting said special identifying signals just prior to the transmission of its associated code signal.

16. A system according to claim 14 wherein said code signals are multi-element signals and said special indicating signals are transmitted together with each code signal as an additional element thereto.

17. A system according to claim 6 wherein said two stations comprise: a master station, and a slave station under control of said master station.

References Cited in the file of this patent

UNITED STATES PATENTS

| | | |
|---|---|---|
| 2,242,196 | Thompson et al. | May 13, 1941 |
| 2,653,996 | Wright | Sept. 29, 1953 |
| 2,706,215 | Van Duuren | Apr. 12, 1955 |